United States Patent
Kozan

(10) Patent No.: US 11,200,299 B2
(45) Date of Patent: *Dec. 14, 2021

(54) CROWD SOURCING FOR FILE RECOGNITION

(71) Applicant: Warner Bros. Entertainment Inc., Burbank, CA (US)

(72) Inventor: Kevin Michael Kozan, Seattle, WA (US)

(73) Assignee: WARNER BROS. ENTERTAINMENT INC., Burbank, CA (US)

(*) Notice: Subject to any disclaimer, the term of this patent is extended or adjusted under 35 U.S.C. 154(b) by 1050 days.

This patent is subject to a terminal disclaimer.

(21) Appl. No.: 15/489,559

(22) Filed: Apr. 17, 2017

(65) Prior Publication Data

US 2017/0220776 A1 Aug. 3, 2017

Related U.S. Application Data

(63) Continuation of application No. 12/901,321, filed on Oct. 8, 2010, now Pat. No. 9,626,456.

(51) Int. Cl.
*G06F 16/00* (2019.01)
*G06F 21/10* (2013.01)
(Continued)

(52) U.S. Cl.
CPC ........ *G06F 21/10* (2013.01); *G06F 16/24578* (2019.01); *G06F 16/907* (2019.01); *G06F 16/951* (2019.01); *G06F 21/6209* (2013.01); *G06F 21/6218* (2013.01); *G11B 20/0021* (2013.01); *G11B 20/00086* (2013.01);
(Continued)

(58) Field of Classification Search
CPC ......... G06F 16/24558; G06F 16/24578; G06F 16/907; G06F 16/951; G06F 21/10; G06F 21/6209; G06F 21/6218; G06F 2221/2107; G11B 20/00086; G11B 20/0021; H04L 63/0428
See application file for complete search history.

(56) References Cited

U.S. PATENT DOCUMENTS 8,694,511 B1 * 4/2014 Corduneanu ........... G06F 16/93
  707/748
2002/0049760 A1 * 4/2002 Scott ..................... H04L 67/104
(Continued)

*Primary Examiner* — Shew Fen Lin
(74) *Attorney, Agent, or Firm* — One LLP

(57) ABSTRACT

Methods for identifying encrypted content in ones of a plurality of encrypted data files in a library of encrypted files without decrypting the data files utilize crowd sourcing for content identification. A method includes selecting, by a computer, content titles for presenting with ones of identifiers for the data files in a data structure. Each of the identifiers includes a hash of metadata for one of the data files and the content titles include a character string that identifies each file's content. The user selection data identifies the content titles that correspond to the data files. The computer determines which content titles satisfy a minimum confidence threshold for associating with one of the identifiers, based on a quality or quantity of the multiple independent clients supplying the user selection data. An apparatus for performing the method includes a memory holding instructions for performing steps of the method as summarized above.

19 Claims, 5 Drawing Sheets

(51) Int. Cl.
*G06F 16/907* (2019.01)
*G06F 16/951* (2019.01)
*G06F 16/2457* (2019.01)
*G06F 21/62* (2013.01)
*G11B 20/00* (2006.01)
*H04L 29/06* (2006.01)
*G06F 16/2455* (2019.01)

(52) U.S. Cl.
CPC .... *H04L 63/0428* (2013.01); *G06F 16/24558* (2019.01); *G06F 2221/2107* (2013.01)

(56) References Cited

U.S. PATENT DOCUMENTS

| | | |
|---|---|---|
| 2004/0255237 A1* | 12/2004 | Tong .................... G06F 16/951 715/232 |
| 2005/0108242 A1 | 5/2005 | Kalker et al. |
| 2006/0031381 A1 | 2/2006 | Van Luijt et al. |
| 2006/0241933 A1* | 10/2006 | Franz .................... G06F 40/274 704/2 |
| 2007/0078832 A1 | 4/2007 | Ott, IV et al. |
| 2007/0276773 A1* | 11/2007 | Aravamudan .... G06F 16/24578 706/11 |
| 2008/0052783 A1 | 2/2008 | Levy |
| 2008/0270154 A1 | 10/2008 | Klots et al. |
| 2009/0307201 A1 | 12/2009 | Dunning et al. |
| 2010/0287196 A1 | 11/2010 | Shields et al. |
| 2011/0099200 A1 | 4/2011 | Blount et al. |
| 2011/0264673 A1* | 10/2011 | White ................. G06F 16/9535 707/750 |
| 2012/0023107 A1 | 1/2012 | Nachnani et al. |

* cited by examiner

CROWD SOURCING FOR FILE RECOGNITION

CROSS-REFERENCE TO RELATED APPLICATION

This patent application is a continuation of U.S. application Ser. No. 12/901,321, now U.S. Pat. No. 9,626,456 issued Apr. 18, 2017, which is hereby incorporated by reference in its entirety.

BACKGROUND

1. Field

The present disclosure relates to recognizing the content of encrypted information, and particularly encrypted digital computer files, using multi-user input via a computer system.

2. Description of Related Art

Many types of digital files are encrypted or otherwise protected for copyright, Digital Rights Management (DRM), or other security purposes. One characteristic of protected files is the inaccessibility of information content contained within the file, except to an end user possessing the necessary decryption key and/or decryption algorithm. Consequently, it is generally necessary to open and decrypt the protected file to accurately determine its content. This requirement may be undesirably burdensome when dealing with a large number of protected files. In such an environment, it may become very difficult for the user to locate particular content in one or more protected files, without knowing beforehand the file name or other unprotected identifier for the file containing the desired content.

These problems may become exacerbated when content files are received from various different sources. When files are obtained from a single source, the source may implement a file naming convention, provide unprotected content-identifying metadata associated with each file and/or provide an unprotected file index, each of which may simplify locating desired content. However, when files are obtained from different sources, such solutions may become less effective, as there is no generally adopted standard for identifying content within protected files. Thus, a user may be unable to locate desired content within a library of protected files obtained from various sources, or may find it overly time-consuming to do so. Many users may accumulate large libraries of protected content digital files stored in computer-readable media from many different sources. Therefore, many users may face difficulty in locating specific content contained in protected files of such libraries.

As used herein, a "file" or "digital file" refers to a set of electronic digital data of determinate size that is encoded in a computer-readable storage medium and referenced by a file name or similar identifier in a directory or similar data structure for the storage medium. As such, a file is clearly distinguished from a packet or other transient data set transmitted via a carrier wave. Information contained in a file and file metadata may be transmitted using a carrier wave, for replicating the file in a different storage medium. Although such transmission and replication may sometimes be referred to as "transmitting a file," this use of terminology does not negate the essential character of a file being a discrete data set encoded in a storage medium.

SUMMARY

It would be desirable, therefore, to provide a technology whereby a computer can be used to identify content contained within each file of a library of protected files, without decrypting the protected files. The technology may be implemented as a method performed using one or more computers configured for serving information over a network, such as a wide area network, utilizing crowd sourcing and other inputs to accurately identify protected files. The technology may be implemented as encoded instructions on a computer-readable medium, which, when executed by one or more processors of a computer, cause the computer to perform the novel method to achieve results as described herein. The technology may be implemented as an apparatus, for example a computer server, having a processor and memory, wherein the memory holds code for causing the server to perform the novel method to achieve results as described herein. The present disclosure therefore discloses illustrative steps of a method as exemplifying the novel technology, which is not limited to a method and may be implemented in various other ways such as just described.

A user may desire to identify one or more subject files stored within a local or remote computer-readable storage medium, and novel method as disclosed herein may provide such identification for users. The novel method may use available file attributes, for example, file name, date, file size, other metadata, media type attributes, any portion of encrypted binary data in the file, and an encryption key ID, to identify the subject file. These file attributes comprise data characteristics for the subject file, which are capable of being obtained by processing the protected file without decrypting the file or otherwise accessing protected content included in the file. Thus, the available file attributes may be obtained using a computer with access to the file, regardless of whether or not the computer has access to a decryption key or other information required to access the protected content.

In addition, the method may include generating an identifier for the file, using the available file attributes as input to a one-way, determinate hashing algorithm. The method may include querying a database or other data structure using the identifier to identify associated information. Querying may be performed in response to obtaining the identifier for the file by processing file attributes. In the database context, "in association with" or "associated" means "related to by the database or data structure," such that the related information can be retrieved by querying the database or data structure using the associated data. The method may then branch depending on whether or not a response to the query indicates that a content title is already associated with the identifier in the data base.

If query results indicate that a content title is already associated with the identifier in the database, the computer may determine whether the content title for the file satisfies a defined minimum confidence threshold. A content title, as used herein, refers to a phrase and/or character string that is used to identify content and to distinguish the content from other content. For example, motion picture content may be identified by a content title such as, for example, "The Dark Knight (2008)." A content title may be deemed to satisfy the confidence threshold if information associated with the file indicates sufficient confirmatory data has been collected, that confirms the content title for the file. Sufficiency of confirmatory data may be determined by a quantity of independent sources for the confirmatory data, by a quality of one or more independent sources for the confirmatory data, or by any usable combination of the quantity and the quality of independent sources. If the computer determines that the content title satisfies the applicable confidence threshold, then the computer may provide the content title to the user, using any suitable client or output device, as an identifier for the subject file.

If query results indicate that no content title is associated with the identifier in the data base, or if the computer determines that the content title does not satisfy the applicable confidence threshold, the computer may query a database of content titles, using as input for the query one or both of a title included in metadata for the file or the file name. The query may be structured to return content titles that are the same as, and similar to, the query input data, using suitable Boolean logic or other query structure. In general, the query should return a limited number of multiple content titles in response to most query input; for example, the closest five or ten content titles. The computer may provide the one or more content titles resulting from the query to the user, using any suitable client or output device. These content titles may be presented to the user in a manner enabling selection of a single one of the titles, together with a request that the user identify the correct title for the file.

The computer may receive and collect the user response to the presentation of the content titles. The response may indicate selection of a particular title, "none of the above," "will not participate," or no response. If the response indicates a particular title, the computer may record the response in the database of content titles, in association with the subject file identifier. In addition, the computer may record information concerning the source of the response, for example, weighting the response in according with reliability data for the user, and/or incrementing a count of users that have selected the same content title for a subject file. In the alternative, if the response indicates "none of the above," the computer may present alternative possible titles to the user, and/or solicit textual input as indicating a title. Further in the alternative, if the response indicates "will not participate" or no response is received from the user, the computer may terminate the current process of soliciting user input from the particular user for the particular subject file, without saving any response data indicative of a content title for the subject file.

Advantageously, the method may be performed in communication with a very large multitude of users, for example by communicating with multiple independent users using one or more communication networks. Hence, users can benefit from identification activities performed by other users. For example, when a particular title is first released as a digital file, initially the database may contain insufficient or no information required to confidently determine that the contains content identified by any particular content title. Thus, the method will initially solicit input from one or more users concerning the content title for the subject file. Once sufficient input has been obtained to satisfy the confidence threshold for the content title, subsequent inquiries regarding the subject file may be handled without requiring user input. In a system with a very large number of users, most users will therefore benefit from input provided by a minority of users, which the computer may use to automatically identify files for all users.

Other features of the present technology should become apparent from the following detailed description in conjunction with the accompanying drawings, which drawings are summarized below.

DRAWINGS

DETAILED DISCLOSURE

Figure 1:
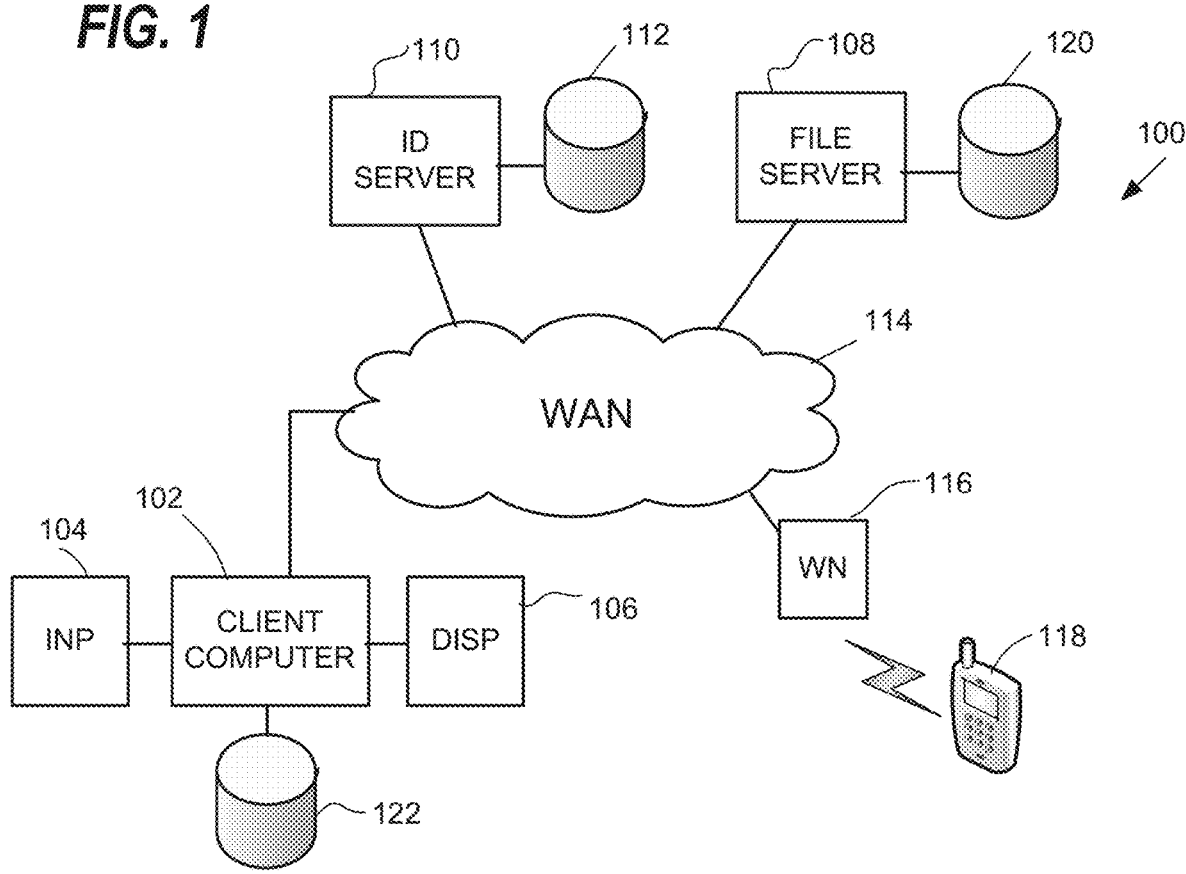
FIG. 1 is a block diagram showing an example of a system for using crowd sourcing to identify protected content in data files.

An example of a system 100 including aspects of crowd sourcing for identifying protected digital content is shown in FIG. 1. The system may comprise a client computer 102, for example, a personal computer, laptop computer, notebook computer, tablet computer, smart phone, or the like, for accessing digital content using a display device 106 to view video output from the client 102, in response to input from an input device 104. Client 102 may comprise a processor, memory, network interface, and computer graphics display driver for providing video output to a display device 106. Files containing protected audio-video content and metadata may be encoded on a computer-readable medium 122 coupled to the client 102, such as, for example, a magnetic, optical, or electronic data storage device. The client 102 may be configured to decode and decompress encoded content, and decrypt protected content, to provide a video signal for the display 106. The computer-readable medium 122 may further hold encoded instructions for performing certain actions as described herein.

System 100 may comprise multiple clients similar to, or essentially the same as, client 102. These multiple clients may operate to provide, in the aggregate, crowd-sourcing data used to identify protected files stored at one or more locations in system 100. For example, system 100 may further comprise one or more wireless networks 116 coupled to a wide area network (WAN) 114, for communicating with one or more wireless clients 118. It is contemplated that a wireless client 118 may include components that are generally the same as or similar to client 102, and perform the same or similar functions.

The client 102 may further comprise a network interface for communicating via the WAN 114, for example, the Internet. Via such an interface and network, the player device may communicate with an identification server 110 operating a crowd-sourcing application responsive to input from multiple clients, such as clients 102 and 118.

The identification server 110 may be coupled to a database 112, which may store crowd-sourcing data collected from multiple clients as described herein in association with identifiers for data files holding protected content. The crowd-sourcing data may include data collected from multiple clients like client 102, and data developed using collected data, for example, selected content titles and confidence data. The identification server 110 may also generate and assign identifiers for files holding protected contents, and perform other functions or methods described herein.

System 100 may further comprise one or more file servers 108 coupled to one or more data storage components 120 holding data files for protected audio-video data and associated metadata. The protected audio-video data comprises content for accessing via clients such as clients 102 and 118. Clients may stream or download encrypted data files from the one or more file servers 108 to view and listen to protected content. Clients may, in the alternative or in addition, access protected content from data files stored in a local storage device, for example in computer-readable medium 122.

Index data, including identifiers and content titles, for data files stored in network locations and locally may be aggregated in a library index for all files accessible via a particular client and/or user account. As noted, such files may be obtained from multiple different sources. In some embodiments, the library index may be stored and maintained at the identification server 110 or other central network server. In the alternative, or in addition, library files may be stored and maintained locally at individual client devices, for example, clients 102 and 118.

Figure 2:
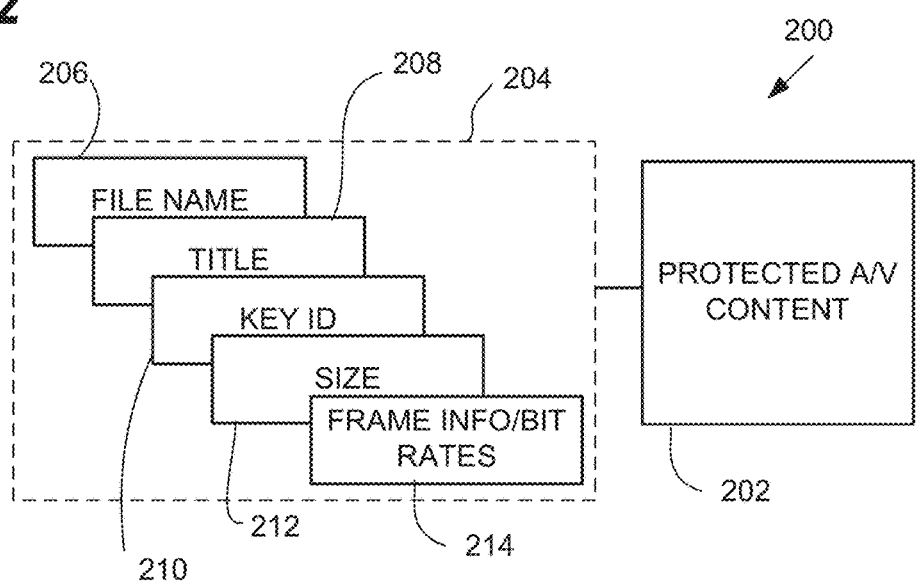
FIG. 2 is a block diagram showing aspects of a data file including protected content and metadata.

Each data file 200 may include a protected component 202 and an associated data component 204, as diagrammed in FIG. 2. The protected component may include content such as video data, audio data, image data, text data, or other content that is protected from access by unauthorized users or devices. For example, the protected content may be encrypted, and not accessible without a secret decryption key. In the alternative, or in addition, the content may be protected using an alternative protection scheme.

The associated component 204 contains unprotected data related to or about content in the protected component 202, and that is accessible without restriction. The unprotected data may include, for example, a file name 206, a purported title 208 or description for the protected content, an identifier 210 for one or more keys needed to access the protected content, a file size 212 and/or file date, and encoding information 214 concerning video frames and bit rates used to encode audio or video data included in the protected content. The unprotected data may include other information which may vary depending on file source. Characteristically for many data files, both the protected content and the metadata are static after file creation, meaning content and metadata do not change. In particular, unprotected data selected for use in file identification should be static for any particular data file.

Figure 3:
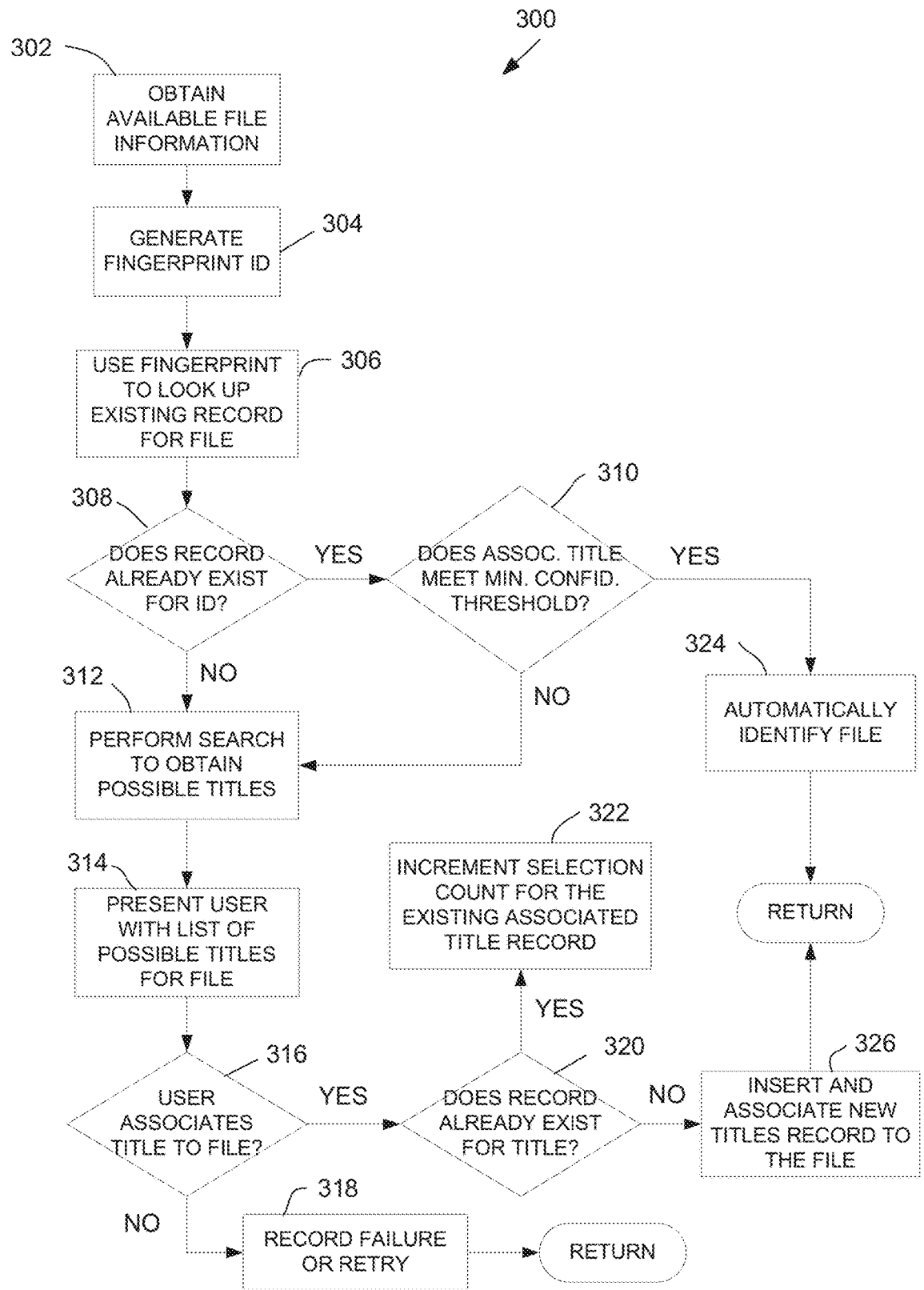
FIG. 3 is a flow chart showing an example of a method for using crowd sourcing to identify protected content in data files.

Examples of actions that may be performed by an identification server as part of a method 300 performed in response to client input to provide file identification data is shown in FIG. 3. The method 300 may be initiated in response to an identification server receiving a request to identify a file from a user. Method 300 may comprise obtaining 302 available metadata for one or more encrypted data files, including file attributes, media-type attributes, and other metadata. Sufficient information for uniquely identifying a file should be obtained, if possible. Examples of metadata that may be obtained are listed below. Some of the data below may not be available for all video file types and/or on all platforms.

1. Filename
2. File size
3. Title (in metadata)
4. Video length
5. Video bitrate
7. Frame width
8. Frame height
9. Audio bitrate
10. Key ID (found in the DRM header of a Windows Media DRM protected file)

The server may then generate 304 a fingerprint ID for the file based on available information, such as, for example, a hash. For example, a processor may generate the fingerprint by concatenating the available information into a single string, and then hashing the string using a SHA-1 cryptographic hash function. In the case of a Windows Media Video file, the Key ID alone is likely sufficient to uniquely identify the file. However, appending other parameters may further uniqueness and reduce the possibility of collisions in the hash results. In some embodiments, a portion of protected data may be included in the hash, for example, the 100 bytes or 1000 bytes taken from a predetermined file location such as, for example, first, last, or at a designated position in the middle.

The fingerprint or hash should only be constructed from the parameters that are equally accessible across the operating systems that support the video file format. For example, if the application program interfaces (APIs) provided in Windows Vista/Windows 7 provide all of the parameters (from step 1) for a Windows Media Video file but the APIs in Windows XP only provide access to the title, audio bitrate, file size, and the video length, only this subset of parameters should be used to generate the fingerprint. To properly identify files where the user has renamed the file, filename may be excluded from input for generating the fingerprint hash ID.

Figure 4:
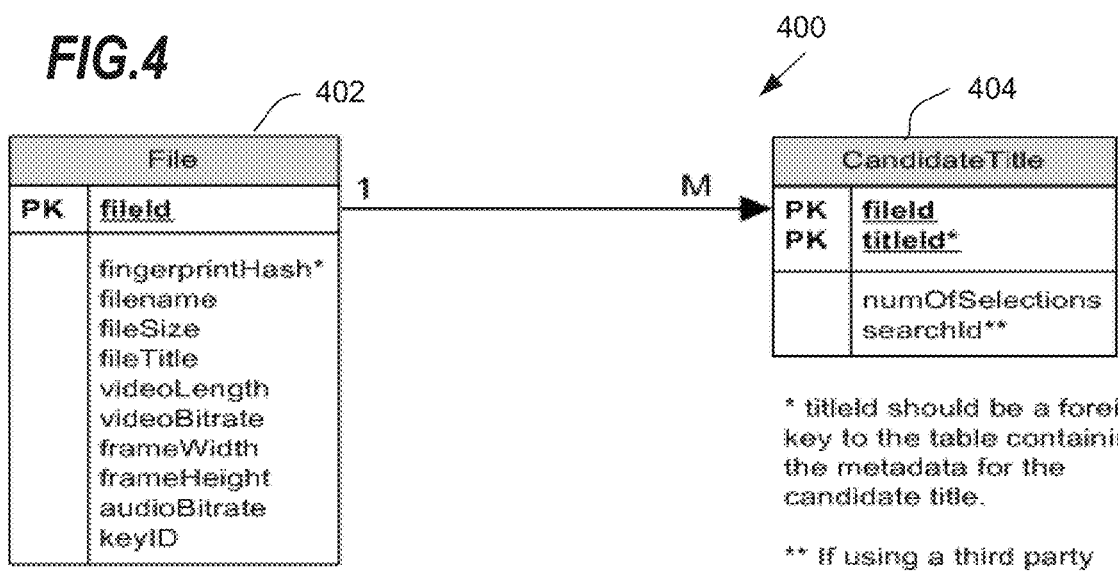
FIG. 4 is a block diagram showing an example of data relationships used for relating a data file to a candidate content title.

The server may then perform a database lookup 306 for the file using the generated ID. Using the generated fingerprint hash, the server may retrieve any existing record for the file. The record may contain all available file information used for generating the hash, which can be used for verification that the correct record has been located. FIG. 4 shows an example of data relationships 400 used for relating a data file 402 to a candidate content title 404.

Referring again to FIG. 3, the server may then determine 308 whether or not a record for the file already exists in the database. In response to determining that a record exists, the server may determine 310 whether or not the record includes or is associated with a title that meets the minimum confidence level. In response to determining that the record includes or is associated with a title meeting a minimum confidence threshold, the server may automatically identify 324 the data file for the user, for example by transmitting the content title to a client device, storing the content title in association with an identifier for the data file, or both.

Determining whether or not a content title meets a minimum confidence threshold may be performed by various methods. For example, after obtaining an existing record for a file, the server may retrieve all previous selections (candidate content titles) for the same file. The server may maintain a count of the number of times each candidate content file was selected by users as the correct title for the file, in association with the data file. Then, for further example, the server may calculate a confidence level for each candidate title as follows: C=N/T, where 'C' is the confidence level, 'N' is the number of times a title was selected by a user, and CT is the total number of user selections. Thus, for example, if a file named "TheDarkKnight_PC_EN.wmv" has the follow candidate titles and selection counts:

Title: The Dark Knight (2008)
Number of User Selections: 26
Title: Darkest Knight 3 (2004)
Number of User Selections: 2

The confidence level for the "The Dark Knight" in this example is therefore 92% ($^{26}/_{28}$). If the minimum confidence level is set to 90%, the file may be automatically identified for the user as "The Dark Knight". In addition, the identification system may enable users to mark an automatic association as incorrect. In response, the system may reduce the selection count for the previously associated title and effectively reduce the confidence level. Furthermore, the system may enforce a minimum selection count requirement, for example, ten or more selections, before deeming a candidate title eligible for automatic association.

In response to determining 308 the file does not exist in the database or to determining 308 the file exists in the database which further determining 310 that the file does not meet the minimum confidence level, the identification server may perform a search 312 based on the title found in the file's metadata (if available) or the filename if the title is not available. In other words, when an automatic association with a content title cannot be made, a list of possible titles for the file needs to be obtained. If a title is available and populated in the video file's metadata, the title may be used as input for the search query. However, in many instances such a title will not be available. Assuming that most files will be named to identify their contents, the filename may be used as the search query when metadata title is not available. Specifically, the filename may be tokenized into keywords using camel case, underscores and periods as delimiters, while the file extension may be removed. For example, the filename TheDarkKnight_PC_EN.wmv may be tokenized into the following keywords: The, Dark, Knight, PC, EN. Based on examination of a number of filenames and learning the naming conventions of different studios and vendors, auxiliary internal keywords such as "PC" and "EN" may be identified by the server and excluded as not pertaining to the semantic content of the title. For the example above, the final search query may therefore be: The Dark Knight.

The query may be directed to a database of content titles, for example, motion picture titles, television episode titles, song titles, book titles, and so forth, depending on the file type. The database may be populated from various sources, such as available title lists from industry or public sources, or titles submitted by users through the identification system. In response to the query, the database may return search results comprising a ranked list of content titles deemed most relevant to the search query, using any suitable search and ranking algorithms.

Using results from the search query, the server may present 314 a list of possible titles for each file to the user, such as by transmitting a web page with the search results to a client operated by a user. The server may further solicit and enable user input regarding the correct title. For example, the web page may include features that enable to user to indicate selection of the correct title from several possibilities in a list. The titles in this list may be provided from the search results and may each include a human-recognizable character string that identifies media content, e.g., "The Dark Knight (2008)", etc. If the file already exists in the database, the server may arrange previous selections rank ordered by the most selections to the least.

For example, for the file TheDarkKnight_PC_EN.wmv, the search results may be displayed in the following order.

| | |
|---|---|
| The Dark Knight (2008) | associated 13 times by users |
| Darkest Knight 3 (2004) | associated 2 times by users |
| Dark Portals: | never associated |
| The Chronicles of Vidocq (2006) | |
| Forever Knight: The Trilogy: Part 1(1992) | never associated |

Figure 5:
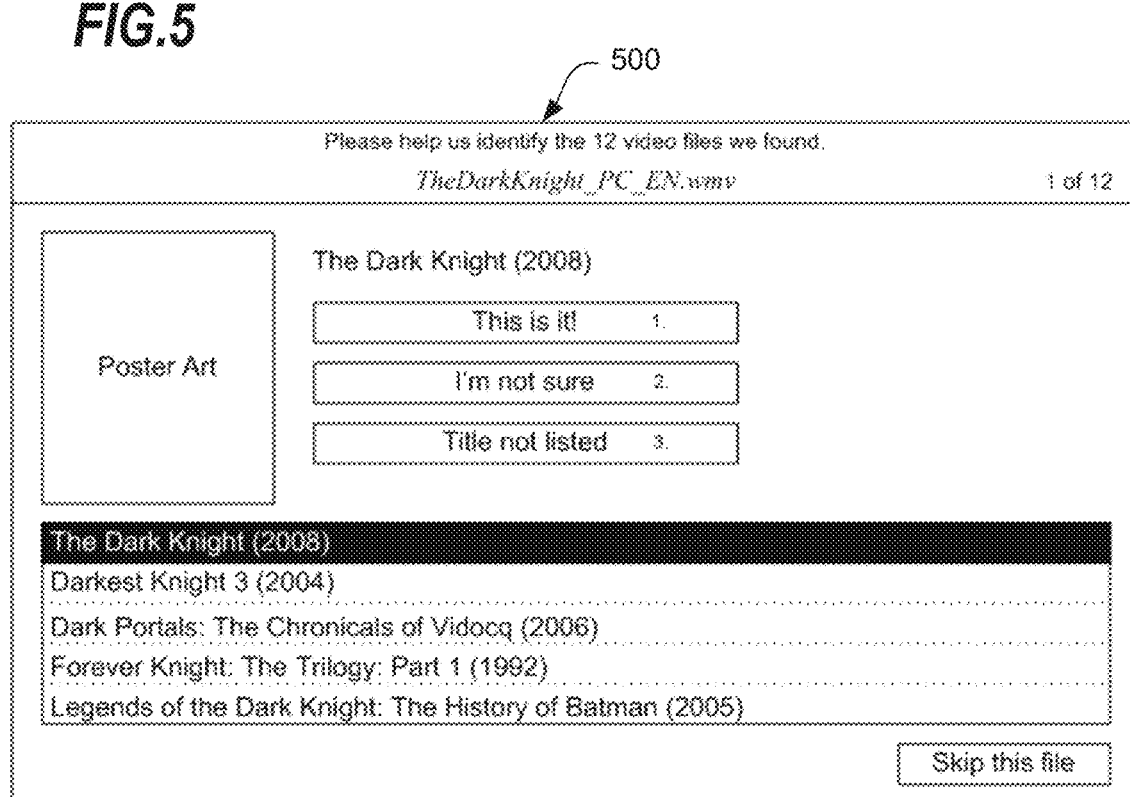
FIG. 5 is a diagram showing an example screenshot for obtaining user input selecting a content title for a data file.

A screenshot exemplifying an interface 500 for display and user selection of content titles is shown in FIG. 5. The interface may be implemented, for example, using HTML or XML tools, and displayed by a client device in response information from the identification server. As each content title is highlighted, the user may select one of the three interactive buttons on the interface. Selection of the first interactive button by a user, using a suitable input device, may cause the interface to transmit a signal to the server, indicating selection of the displayed content title. Selection of the second interactive button may cause the interface to provide the user with the option of accessing the content to verify its correct title. Selection of the third interactive button may cause the interface to open a search box enabling the user to search for the correct title.

Referring again to FIG. 3, the server may update the database to record the user's selection. More particularly, in response to determining 316 that the user has associated a title to a file, the server may increment the selection count for the candidate title 322 if a record already exists for the file 320. Conversely, if the record does not exist 320, the server may insert 326 a new record for the file and initiate a selection count record for the content title. In response to determining 316 that the user has not associated a title to the file, the server may initiate a retry procedure 318 or terminate and record a selection failure. The server may also create a record so that the file is identified for the requesting user or users as soon as a content title satisfies the applicable confidence criteria.

In general, the system may be configured such that each user has the ability to retract a selected title association in the future. In the event that the user chooses to retract a selected title association, the selection count for the candidate title should be decremented.

Figure 6:
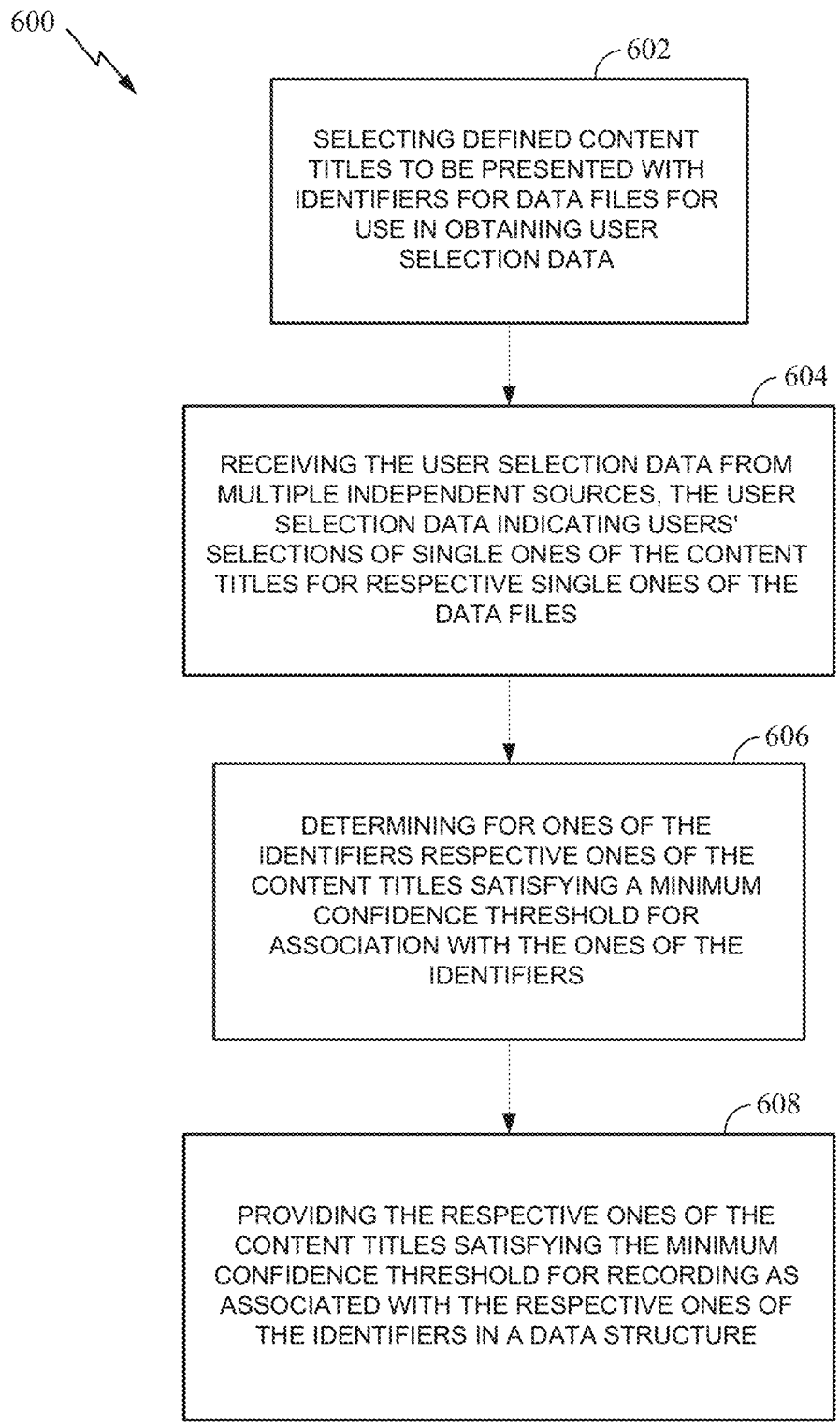
FIG. 6 is a flow chart showing another example of a method using crowd sourcing to identify protected content in data files.

Consistent with method 300, one or more computer servers may be configured to perform a method 600 for identifying a content title for protected content in a data file, as shown in FIG. 6. Method 600 may therefore comprise selecting 602, using one or more computers, defined content titles to be presented with identifiers for encrypted data files for use in obtaining user selection data. The foregoing description provides an example of selecting content titles from results of a search query of a title database.

Method 600 may further comprise receiving 604 the user selection data from multiple independent sources. For example, the one or more computers may receive the user selection data from multiple clients operated by independent users. The user selection data may indicate users' selections of single ones of the content titles for respective single ones of the encrypted data files.

Method 600 may further comprise determining 606 for ones of the identifiers respective ones of the content titles satisfying a minimum confidence threshold for association with the ones of the identifiers. This determination may be made using the one or more computers processing the user selection data according to the examples described above. As a result of method 600, data records are developed in which content titles satisfying the minimum confidence threshold are associated with respective unique identifiers for the encrypted data files. Method 600 may further comprise providing 608 the respective ones of the content titles satisfying the minimum confidence threshold for recording as associated with the respective ones of the identifiers in a data structure. The data structure may include a centralized database, multiple databases local to clients, or both.

Figure 7:
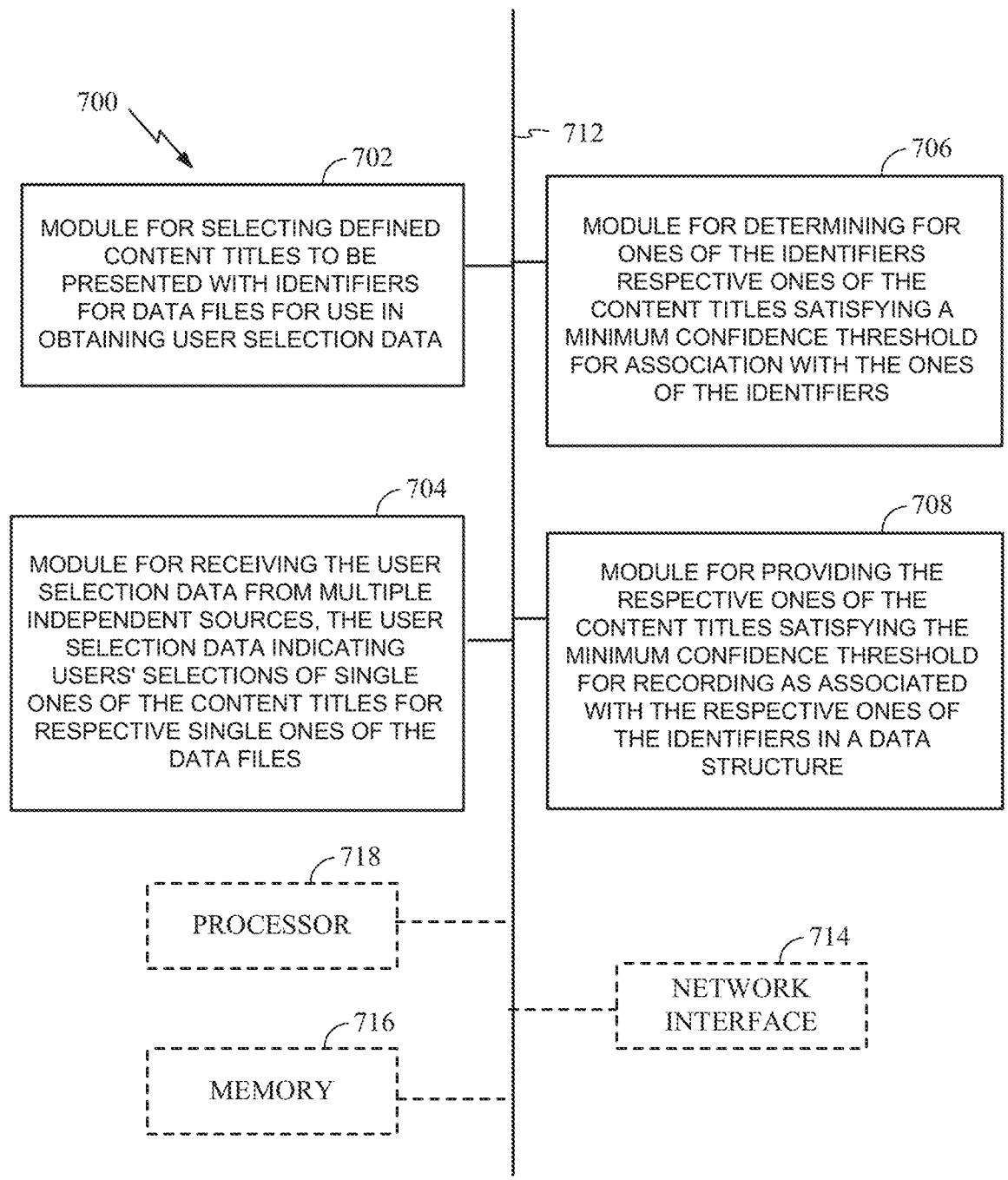
FIG. 7 is a block diagram showing illustrative components of an apparatus for using crowd sourcing to identify protected content in data files.

Consistent with method 600, and as further illustrated by FIG. 7, an apparatus 700 may function as a server for identifying encrypted data files in response to input from multiple clients and to title information from various sources. The apparatus 700 may comprise an electronic component or module 702 for selecting defined content titles to be presented with identifiers for encrypted data files for use in obtaining user selection data; for example, by generating a search query and selecting titles from results for the query. The apparatus 700 may comprise an electronic component or module 704 for receiving the user selection data from multiple independent sources; for example, from multiple clients operated by independent users. In addition, the apparatus 700 may comprise an electronic component or module 706 for determining for ones of the identifiers respective ones of the content titles satisfying a minimum confidence threshold for association with the ones of the identifiers; for example using selection count rations as described above. The apparatus 700 may comprise an electronic component or module 708 for providing the respective ones of the content titles satisfying the minimum confidence threshold for recording as associated with the respective ones of the identifiers in a data structure.

The apparatus 700 may optionally include a processor module 718 having at least one processor; in the case of the apparatus 700 this may be configured as a computer server, rather than as a general purpose microprocessor. The processor 718, in such case, may be in operative communication with the modules 702-708 via a bus 712 or similar communication coupling. The processor 818 may effect initiation and scheduling of the processes or functions performed by electrical components 702-708.

In related aspects, the apparatus 700 may include a network interface module 714 through with the processor 718 may send and receive information to clients and other servers. In further related aspects, the apparatus 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-708, and subcomponents thereof, or the processor 718, or the methods disclosed herein, and other operations for content identification, playing, copying, and other use. The memory module 716 may retain instructions for executing functions associated with the modules 702-708. While shown as being external to the memory 716, it is to be understood that the modules 702-708 may exist at least partly within the memory 716.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

The appended claims should be understood in the context of the foregoing disclosure, but are not limited to specific examples or details of the disclosure except to the extent expressly recited in respective ones of the claims.

The invention claimed is:

1. A method for identifying encrypted content in ones of a plurality of encrypted data files in a library of encrypted data files without decrypting the encrypted data files, the method comprising:

selecting, by one or more computers, multiple different ones of content titles from a plurality of content titles for presenting with singular ones of identifiers for the encrypted data files in a data structure, wherein each of the identifiers includes or is associated with a hash of metadata for a corresponding one of the encrypted data files, each of the content titles comprises a human-recognizable character string that identifies media content encrypted in the each file of the library, and ones of the encrypted data files are associated with plural ones of the multiple different content titles;

receiving user selection data from multiple independent clients indicating users' selections of single ones of the content titles for corresponding ones of the encrypted data files;

determining for ones of the identifiers, using the one or more computers processing the user selection data, respective ones of the content titles satisfying a minimum confidence threshold for associating as a most correct one of the multiple different content titles with the ones of the identifiers, based on at least one of a quality or quantity of the multiple independent clients supplying the user selection data;

recording the content titles satisfying a minimum confidence threshold and associated identifiers for the plurality of encrypted data files in the data structure; and providing content from at least one of the encrypted data files to a client device, based at least in part on an associated one of the content titles satisfying the minimum confidence threshold for the at least one of the encrypted data files.

2. The method of claim 1, further comprising providing the respective ones of the content titles satisfying the minimum confidence threshold for recording in the data structure associated with the respective ones of the identifiers in a data structure.

3. The method of claim 2, further comprising querying the data structure using a content title to identify the at least one of the encrypted data files containing content titled by the content title.

4. The method of claim 2, further comprising querying the data structure using an identifier to provide an associated one of the content titles for use in identifying the at least one of the encrypted data files.

5. The method of claim 4, further comprising providing a content title for the at least one of the encrypted data files based on the content title satisfying the minimum confidence threshold associated with an identifier for the data file.

6. The method of claim 4, further comprising providing a message indicating that user input is needed to identify the at least one of the encrypted data files, based on determining that the identifier is not associated with any content title satisfying the minimum confidence threshold.

7. The method of claim 2, further comprising automatically organizing a directory of the encrypted data files based on the respective ones of the content titles being associated with the respective ones of the identifiers for the encrypted data files.

8. The method of claim 1, further comprising processing the encrypted data files stored in a computer-readable storage medium to automatically generate the identifiers using a hashing algorithm.

9. The method of claim 1, wherein the one or more computers comprise multiple computer servers operatively coupled to each other.

10. The method of claim 1, further comprising generating the identifiers using a one-way hashing algorithm operating on respective ones of the encrypted data files.

11. An apparatus comprising a processor coupled to a memory, the memory holding instructions for identifying encrypted content in ones of a plurality of encrypted data files in a library of encrypted data files without decrypting the encrypted data files, at least in part by:

selecting multiple different ones of content titles from a plurality of content titles for presenting with singular ones of identifiers for the encrypted data files in a data structure, wherein each of the identifiers includes or is associated with a hash of metadata for a corresponding one of the encrypted data files, each of the content titles comprises a human-recognizable character string that identifies media content encrypted in the each file of the library, and ones of the encrypted data files are associated with plural ones of the multiple different content titles;

receiving user selection data from multiple independent clients indicating users' selections of single ones of the content titles for corresponding ones of the encrypted data files;

determining for ones of the identifiers, using the one or more computers processing the user selection data, respective ones of the content titles satisfying a minimum confidence threshold for associating as a most correct one of the multiple different content titles with the ones of the identifiers, based on at least one of a quality or quantity of the multiple independent clients supplying the user selection data;

recording the content titles satisfying a minimum confidence threshold and associated identifiers for the plurality of encrypted data files in the data structure; and providing content from at least one of the encrypted data file to a client device, based at least in part on an associated one of the content titles satisfying the minimum confidence threshold for the at least one of the encrypted data files.

12. The apparatus of claim 11, wherein the memory further holds instructions for providing the respective ones of the content titles satisfying the minimum confidence threshold for recording in the data structure associated with the respective ones of the identifiers in a data structure.

13. The apparatus of claim 12, wherein the memory further holds instructions for querying the data structure using a content title to identify the at least one of the encrypted data files containing content titled by the content title.

14. The apparatus of claim 12, wherein the memory further holds instructions for querying the data structure using an identifier to provide an associated one of the content titles for use in identifying at least one of the encrypted data files.

15. The apparatus of claim 14, wherein the memory further holds instructions for providing a content title for the at least one of the encrypted data files based on the content title satisfying the minimum confidence threshold associated with an identifier for the at least one of the encrypted data files.

16. The apparatus of claim 14, wherein the memory further holds instructions for providing a message indicating that user input is needed to identify the at least one of the encrypted data files, based on determining that the identifier is not associated with any content title satisfying the minimum confidence threshold.

17. The apparatus of claim 12, wherein the memory further holds instructions for automatically organizing a directory of the encrypted data files based on the respective ones of the content titles being associated with the respective ones of the identifiers for the encrypted data files.

18. The apparatus of claim 11, wherein the memory further holds instructions for processing encrypted data files stored in a computer-readable storage medium to automatically generate the identifiers using a hashing algorithm.

19. The apparatus of claim 11, wherein the memory further holds instructions for generating the identifiers using a one-way hashing algorithm operating on respective ones of the encrypted data files.

* * * * *